(12) United States Patent
Yagihashi et al.

(10) Patent No.: US 11,981,441 B2
(45) Date of Patent: May 14, 2024

(54) SAFETY DEVICE, AND FLYING BODY PROVIDED WITH SAFETY DEVICE

(71) Applicant: NIPPON KAYAKU KABUSHIKI KAISHA, Tokyo (JP)

(72) Inventors: Yasuhiko Yagihashi, Tokyo (JP); Hideki Otsubo, Tokyo (JP)

(*) Notice: Subject to any disclaimer, the term of this patent is extended or adjusted under 35 U.S.C. 154(b) by 78 days.

(21) Appl. No.: 17/905,259

(22) PCT Filed: Feb. 22, 2021

(86) PCT No.: PCT/JP2021/006692
§ 371 (c)(1),
(2) Date: Sep. 1, 2022

(87) PCT Pub. No.: WO2021/177084
PCT Pub. Date: Sep. 10, 2021

(65) Prior Publication Data
US 2023/0116259 A1 Apr. 13, 2023

(30) Foreign Application Priority Data

Mar. 6, 2020 (JP) .................................. 2020-039403

(51) Int. Cl.
*B64D 17/44* (2006.01)
*B64D 17/62* (2006.01)
*B64D 17/80* (2006.01)

(52) U.S. Cl.
CPC ............. *B64D 17/44* (2013.01); *B64D 17/62* (2013.01); *B64D 17/80* (2013.01)

(58) Field of Classification Search
CPC ........ B64D 17/44; B64D 17/62; B64U 20/30; B64U 70/83
See application file for complete search history.

(56) References Cited

U.S. PATENT DOCUMENTS

2016/0332738 A1* 11/2016 Hiisilä ................. B64C 39/024
2021/0155343 A1* 5/2021 Ogden .................. B64D 17/70

FOREIGN PATENT DOCUMENTS

JP 2020-1680 A 1/2020

OTHER PUBLICATIONS

ISR; Japan Patent Office; May 18, 2021.

* cited by examiner

*Primary Examiner* — Richard G Davis
(74) *Attorney, Agent, or Firm* — Patshegen IP; Moshe Pinchas

(57) ABSTRACT

There are provided a safety apparatus and an aerial vehicle including the safety apparatus, in which a lid and an opening end of a container are fixed before operation more firmly than a conventional art to be less susceptible to an external environment. A safety apparatus includes a piston member 10, a cylinder 14 that accommodates the piston member 10 and is provided with a bore 13 through which the piston member 10 protrudes to the outside during operation, a push-up member 15 that is pushed up in one direction by the piston member 10, an ejected object 16 that is pushed up while being supported by the push-up member 15, and a gas generator 17 that moves the piston member 10 in the cylinder 14. A bottomed cylindrical portion 19 of the push-up member 15 has a hole 53, the hole 53 has a substantially identical shape to a shape of one end of a rod 12, and the one end of the rod 12 is fitted to the hole 53. The bottomed cylindrical portion 19 and the rod 12 are fastened and fixed by a bolt member 15.

5 Claims, 6 Drawing Sheets

SAFETY DEVICE, AND FLYING BODY PROVIDED WITH SAFETY DEVICE

TECHNICAL FIELD

The present invention relates to a safety apparatus that ejects an ejected object such as a parachute or a paraglider, and relates to an aerial vehicle including the safety apparatus.

BACKGROUND ART

In recent years, with the development of an autonomous control technology and a flight control technology, an industrial use of an aerial vehicle provided with a plurality of rotor blades called a drone, for example, has been accelerating. The drone flies, for example, by simultaneously rotating a plurality of rotor blades in a well-balanced manner, ascends and descends by increasing or decreasing a rotation speed of the rotor blades, and can advance and retreat by tilting an airframe by increasing and decreasing the rotation speed of the rotor blades. Such aerial vehicles are expected to spread worldwide in the future.

Meanwhile, the risk of fall accidents of the aerial vehicles as described above is considered to be dangerous and hinders spread of the aerial vehicles. In order to reduce the risk of such fall accidents, parachute apparatuses for aerial vehicles have been commercialized as safety apparatuses.

As an example of the parachute safety apparatus, the applicant(s) filed an application according to Patent Literature 1 below. As illustrated in FIG. 1 of Patent Literature 1, a safety apparatus of Patent Literature 1 includes a piston member (sliding member), a cylinder that accommodates the piston member and is provided with a bore through which the piston member protrudes to the outside during operation, a push-up member pushed up in one direction by the piston member, an ejected object pushed up while being supported by the push-up member, and a gas generator that moves the piston member in the cylinder, in which the push-up member has a support disposed at a terminal end of the piston member with respect to a distal end of the piston member in a moving direction of the piston member. A bottom of the push-up member is fixed to the distal end of the piston member.

CITATION LIST

Patent Literature

Patent Literature 1: JP 2020-001680 A

SUMMARY OF INVENTION

Technical Problems

As a method of fixing the distal end of the piston member to the bottom of the push-up member in Patent Literature 1, there is considered a method of joining and fixing the distal end of the piston member using an adhesive or the like, or a method of fastening and fixing a bolt having an external thread by screwing the bolt into an internal thread provided from the bottom of the push-up member to the distal end of the piston member. However, when bonding and fixing are performed using an adhesive, for example, when an inner diameter of the bottomed cylindrical portion of the push-up member is larger than an outer diameter of the cylinder to generate a gap, it may be difficult to position a center between the bottom of the bottomed cylindrical portion of the push-up member and the distal end of the piston member. When the fastening and fixing are performed as described above, the piston may rotate together in the cylinder to make assembling difficult.

An object of the present invention is to provide a safety apparatus that is easier to assemble than a conventional art, and an aerial vehicle including the safety apparatus.

Solutions to Problems (1) A safety apparatus of the present invention includes a sliding member, a cylinder that accommodates the sliding member in an inside and is provided with a bore through which the sliding member protrudes from the inside to an outside during operation, a push-up member including a bottomed cylindrical portion disposed to cover at least a part of the cylinder and a flange protruding to the outside from an opening or a midway of a side surface of the bottomed cylindrical portion, the push-up member being pushed up in one direction by the sliding member, an ejected object that is pushed up while being supported by the flange of the push-up member, and a power source that moves the sliding member in the cylinder to protrude from the inside to the outside, in which the sliding member has one end (hereinafter, sliding member end) in a protruding direction to the outside, the one end having a cross section of a non-circular shape, the bottomed cylindrical portion includes a bottom provided with a first hole having an insertion opening into which the sliding member end is inserted from the cylinder, and at least a part of the first hole is provided with a fitting portion to which the sliding member end is fitted, the fitting portion having a substantially identical shape to the non-circular shape.

(2) In the safety apparatus according to (1), preferably, the bottom of the bottomed cylindrical portion is an integrally molded product having a substantially flat plate shape or a substantially columnar shape, the fitting portion is provided on a part of the first hole including the insertion opening or a midway of the first hole not including the insertion opening, a second hole having a diameter smaller than a diameter of the first hole and communicating with the first hole is provided on a side of the bottom of the bottomed cylindrical portion, the side being opposite to the cylinder, and the sliding member and the push-up member are fastened and fixed by fastening a bolt member having an external thread to an internal thread provided at one end of the sliding member in a protruding direction to the outside through the first hole and the second hole, or the sliding member and the push-up member are fastened and fixed by fastening a nut member having an internal thread to an external thread provided at a distal end of the sliding member protruding through the first hole and the second hole.

(3) As another aspect, in the safety apparatus according to (1), the bottom of the bottomed cylindrical portion may include a substantially flat plate part or a substantially columnar part, and a cylindrical member fixed to a side of the substantially flat plate part or the substantially columnar part, the side being opposite to the cylinder, the first hole may be provided from the insertion opening to an inner side of the cylindrical member, and the fitting portion may be provided in at least a part of the inner side of the cylindrical member.

(4) In the safety apparatus according to (1) to (3), the non-circular shape is preferably a polygonal shape, an elliptical shape, a star shape, or a gear shape.

(5) An aerial vehicle of the present invention includes the safety apparatus according to any of (1) to (4), in which the ejected object is a parachute or a paraglider.

Advantageous Effects of Invention

The present invention can provide a safety apparatus that is easier to assemble before operation than a conventional art, and an aerial vehicle including the safety apparatus.

BRIEF DESCRIPTION OF DRAWINGS

FIG. 4(b) is a side view, and FIG. 4(c) is a perspective view of a lid in the safety apparatus in FIG. 1.

DESCRIPTION OF EMBODIMENT

Hereinafter, a safety apparatus according to an embodiment of the present invention will be described with reference to FIGS. 1 to 5.

Figure 1:
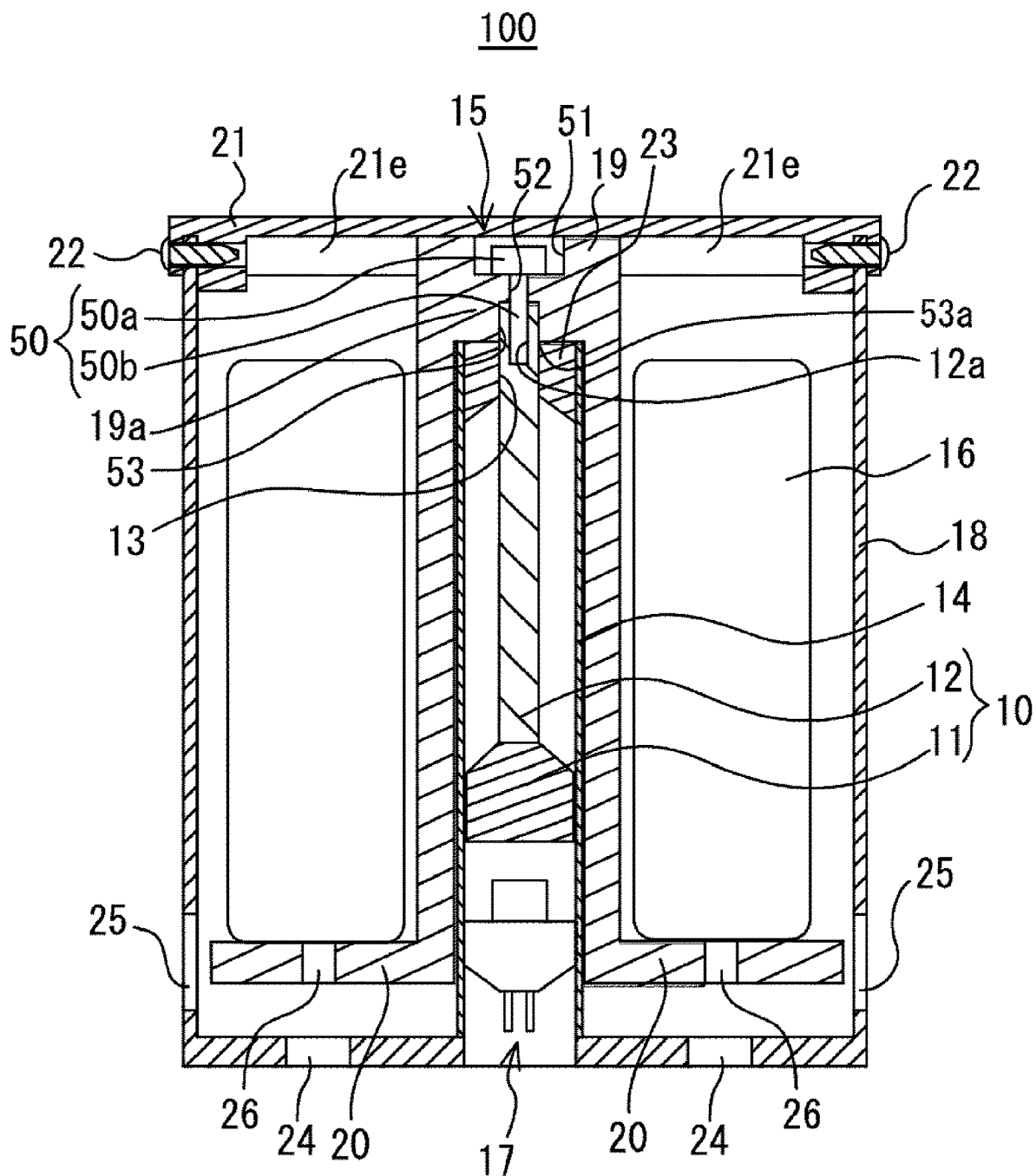
FIG. 1 is a sectional view of a safety apparatus according to an embodiment of the present invention.
Figure 2:
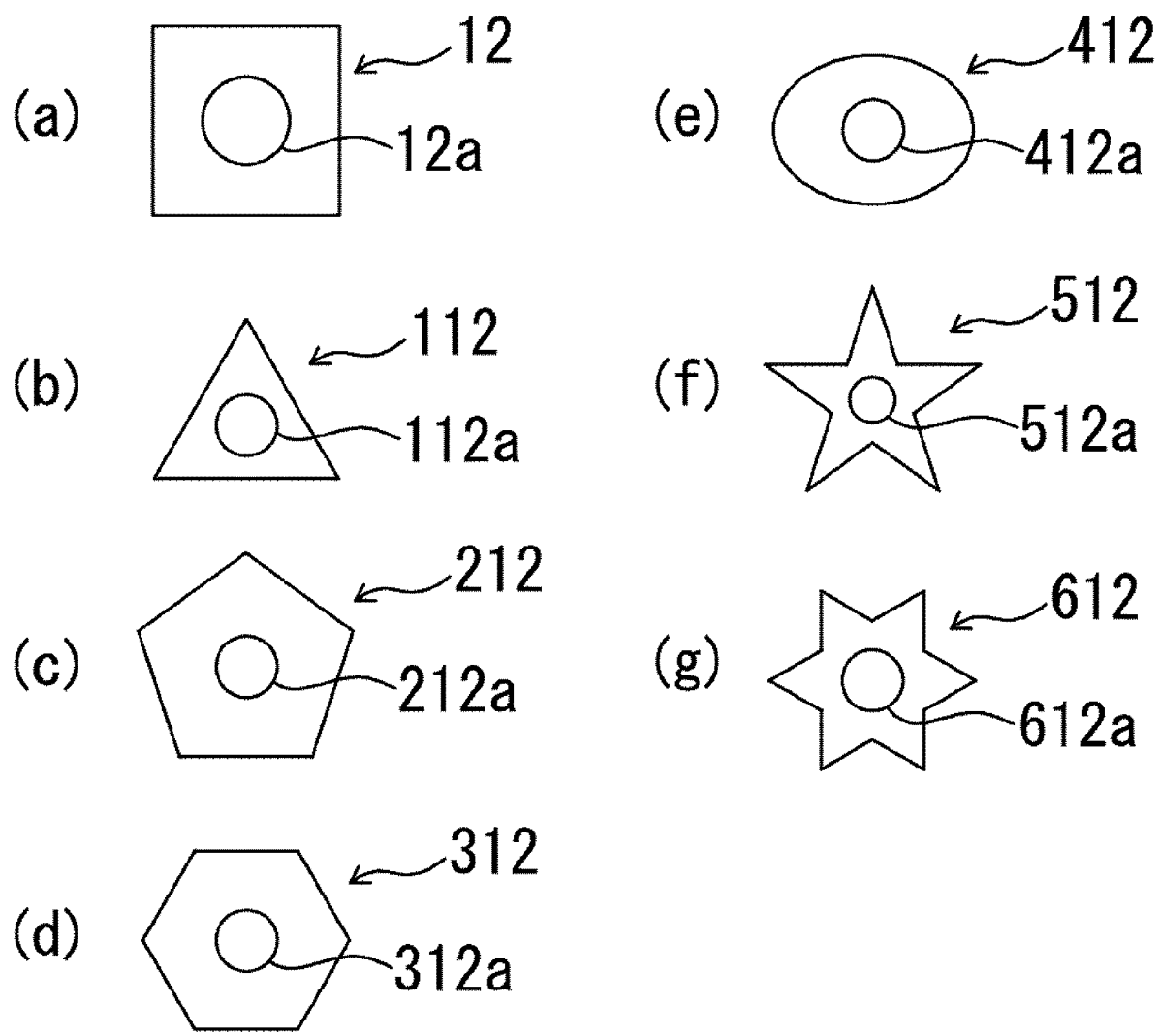
FIG. 2(a) is a top view of a rod of a piston member in the safety apparatus in FIG. 1, and FIGS. 2(b) to 2(g) are modifications of FIG. 2(a).
Figure 3:
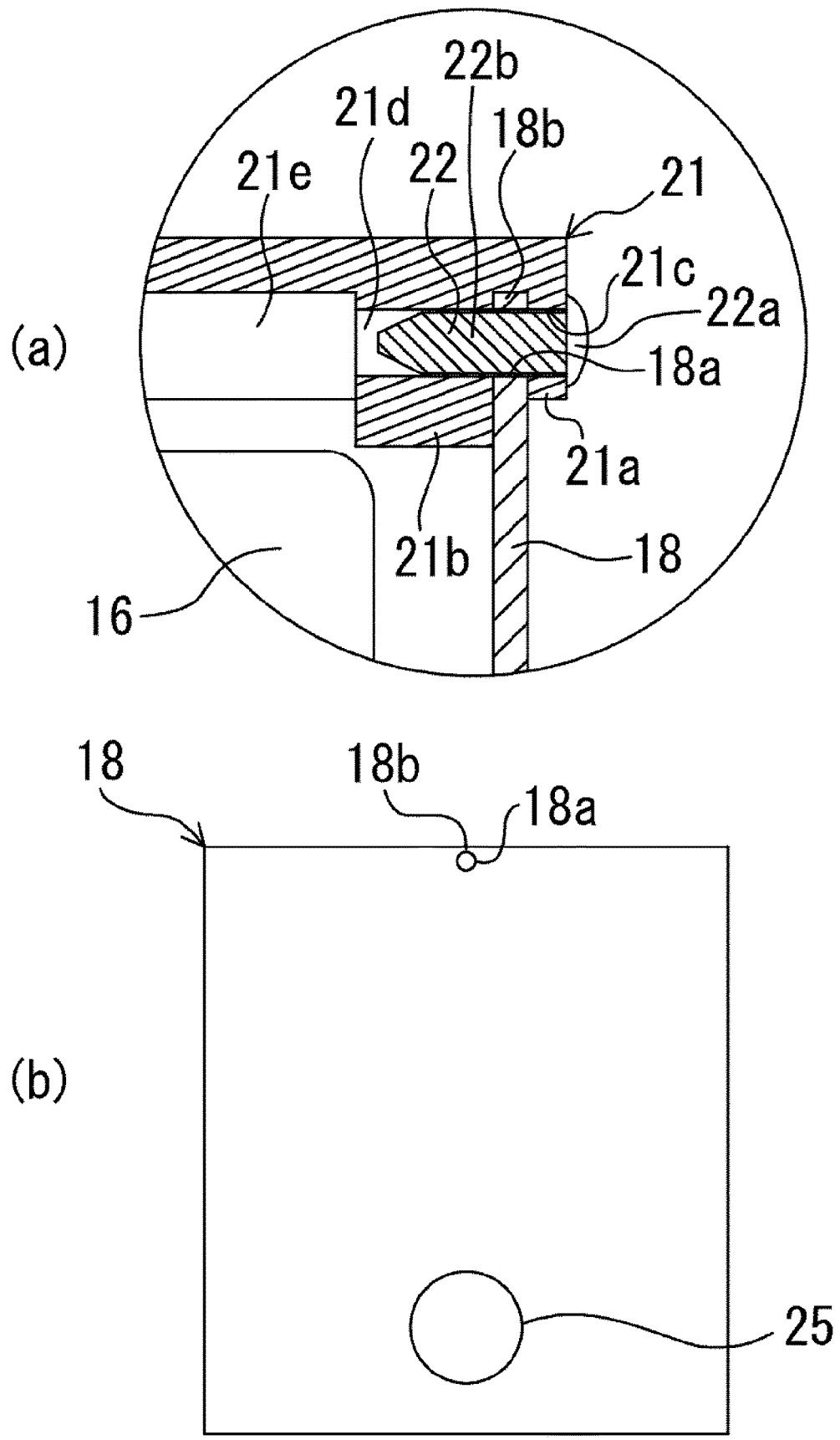
FIG. 3(a) is a partially enlarged view of the safety apparatus in FIG. 1.
FIG. 3(b) is a side view of a container in the safety apparatus in FIG. 1.

As illustrated in FIG. 1, a safety apparatus 100 according to the present embodiment includes a piston member 10 as a sliding member, a cylinder 14 that accommodates the piston member 10 and is provided with a bore 13 through which the piston member 10 protrudes to the outside (upward in FIG. 1) during operation, a push-up member 15 that is pushed up in one direction (upward in FIG. 1) by the piston member 10, an ejected object 16 that is pushed up while being supported by the push-up member 15, a gas generator (micro gas generator or the like) 17 as a power source that moves the piston member 10 in the cylinder 14, a bottomed cylindrical container 18 that accommodates the piston member 10, the cylinder 14, the push-up member 15, the ejected object 16, and the gas generator 17, and a lid 21 that closes an opening end of the container 18.

In the present embodiment, the ejected object 16 is a parachute or a paraglider. The gas generator 17 is disposed below a body 11 (described later) of the piston member 10 in a state of being press-fitted into an opening end below the cylinder 14. A lower part of the cylinder 14 is fixed to a bottom of the container 18.

The piston member 10 includes the body 11 having a part with an outer diameter substantially equal to an inner diameter of the cylinder 14, and includes a rod 12 connected to the body 11, extending upward, and having a smaller diameter than the body 11.

An internal thread 12a is formed from a distal end to a midway along a central axis at an upper end of the rod 12. At least the upper end of the rod 12 has a non-circular (here, square as illustrated in FIG. 2(a)) cross section. Here, the non-circular shape is, for example, a polygonal shape (for example, FIGS. 2(a) to 2(d)), an elliptical shape (for example, FIG. 2(e)), a star shape (for example, FIG. 2(i)), a gear shape (for example, FIG. 2(g)), or the like, and includes any shape as long as being a non-circular shape. An external thread 50b of a bolt member 50 (described later) can be screwed with the internal thread 12a.

A stopper 23 disposed so as to surround a part of the rod 12 of the piston member 10 is provided in an upper inner part of the cylinder 14. That is, the rod 12 is disposed in a state of being inserted through the stopper 23. As a result, when the piston member 10 moves upward, the body 11 comes into contact with the stopper 23 and stops, and thus the body 11 is not released to the outside from the inside of the cylinder 14.

As illustrated in FIG. 1, the push-up member 15 includes a bottomed cylindrical portion 19 disposed so as to cover a part of the cylinder 14, that is, an outer part of the cylinder 14 except for a vicinity of the opening end at which the gas generator 17 is disposed, and the push-up member 15 includes a support 20 having a disc shape, provided as a flange at an opening of the bottomed cylindrical portion 19, and supporting the ejected object 16.

The bottomed cylindrical portion 19 includes a bottom 19a having a substantially flat plate shape or a substantially columnar shape (substantially columnar shape in the present embodiment), a hole 51 formed in the bottom 19a close to the lid 21, a hole 52 (second hole) having a diameter smaller than a diameter of the hole 51, and a hole 53 (first hole) communicating with the hole 51 through the hole 52 and having a diameter larger than the diameter of the hole 52. The hole 51 has a diameter larger than a diameter of a head 50a of the bolt member 50. The hole 52 has a diameter smaller than the diameter of the head 50a, and can guide the external thread 50b of the bolt member 50 inserted from the hole 51 to the hole 53. The hole 53 has a substantially identical shape to a shape of one end (upper end) of the rod 12, and is a fitting portion into which one end of the rod 12 is fitted by inserting the one end of the rod 12 from an insertion opening 53a provided in the bottom 19a of the bottomed cylindrical portion 19, close to the cylinder 14.

The bolt member 50 couples the rod 12 and the push-up member 15 by inserting the external thread 50b into the hole 51 from the hole 52 and screwing the external thread 50b with the internal thread 12a of the rod 12 fitted in the hole 53. At this time, since the one end of the rod 12 has a non-circular shape and is fitted in the hole 53 having a substantially identical shape to the one end, the rod 12 does not rotate together when the bolt member 50 is threaded with the internal thread 12a. Specifically, a distal end of the push-up member 15 and a distal end of the piston member 10, which are non-circular and fitted to each other, can be rotated with the push-up member 15 fixed when being fastened by the bolt member 50, and the piston member 10 can be fastened toward the gas generator 17 and can be fastened without being rotated together.

The support 20 is provided apart from an inner surface of the bottom of the container 18 in an initial state. The support 20 has a vent hole 26 for reducing an influence of a negative pressure generated between the bottom of the ejected object 16 and the support 20 during operation to facilitate ejection of the ejected object 16. An outer periphery of the support 20 is formed so as not to be in contact with an inner side of the container 18.

Figure 4:
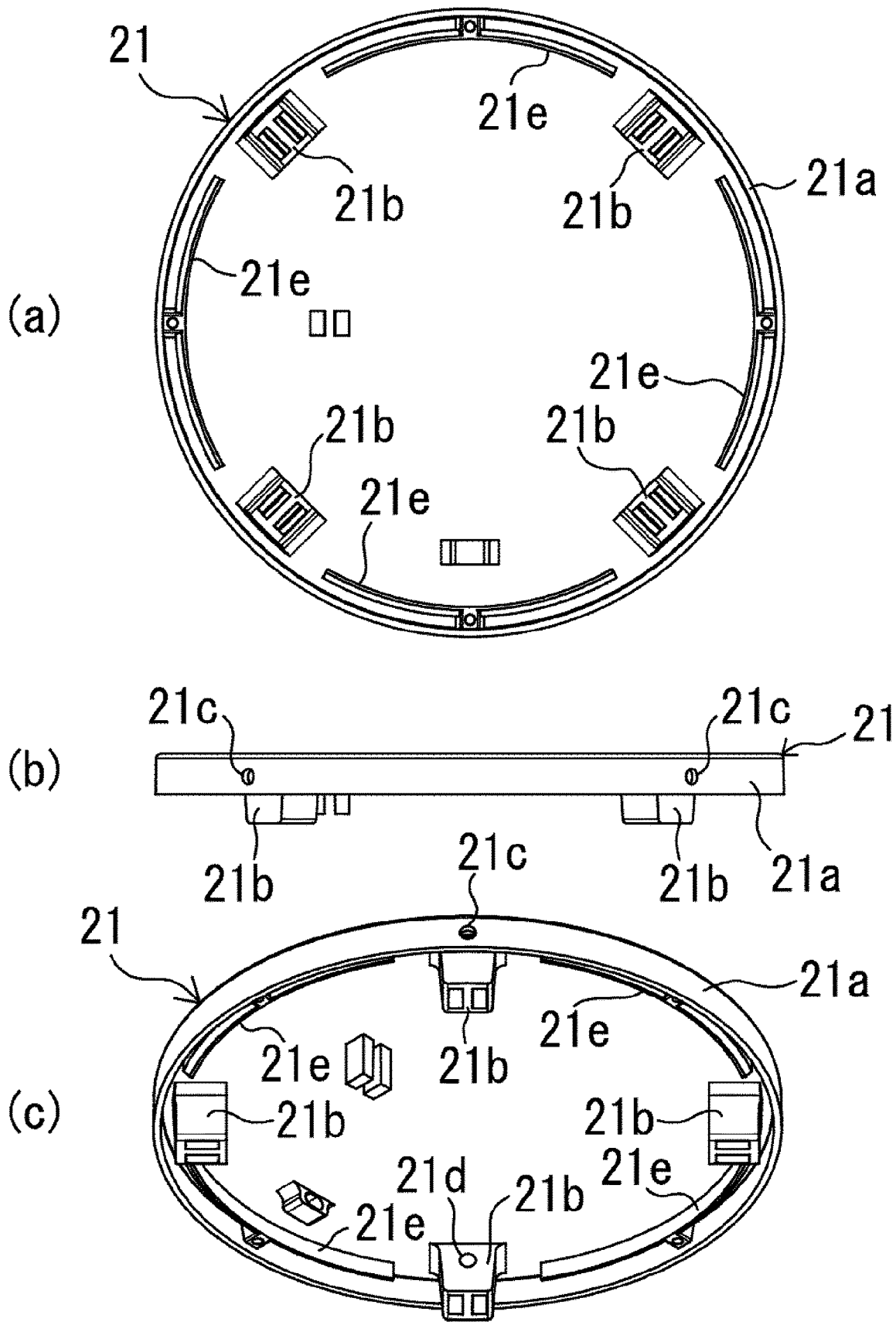
FIG. 4 is a plan view.

As illustrated in FIGS. 3(a) and 4, the lid 21 includes a cylindrical projection 21a extending from an edge toward the container 18, a receiving member 21b provided so as to protrude toward the container 18 at a position facing the projection 21a and sandwiching the opening end of the container 18, and a reinforcing member 21e reinforcing a top surface of the lid 21.

The projection 21a has a through hole 21c penetrating toward a center of the lid 21. A pin member 22 is inserted into the through hole 21c and a through hole 18a (described later) to configure an engagement mechanism that engages the opening end of the container 18 and the projection 21a. Here, the projection 21a has a cylindrical shape, but may be any projection (such as a protrusion) provided so as to face the receiving member 21b and having the through hole 21c, and need not have a cylindrical shape.

The receiving member 21b has a through hole 21d penetrating toward the center of the lid 21. When the pin member 22 is inserted into the through hole 21c and the through hole 18a, the through hole 21d receives a distal end of the pin member 22 (the distal end of the pin member 22 is inserted), and the opening end of the container 18 and the lid 21 can be more firmly fixed.

The pin member 22 includes a head 22a having a diameter larger than a diameter of the through hole 21c, and a rod 22b provided with the head 22a at one end and inserted into and fitted to the through holes 18a, 21c, and 21d. The pin member 22 is provided with a locking portion that prevents the pin member from coming off after being inserted into the through holes 18a, 21c, and 21d before operation. Specific examples of the pin member 22 include a brush clip pin, a trim clip pin, and the like, but are not limited thereto, and any pin member may be used as long as having a locking portion (including a locking portion having a relatively high frictional force on a surface of the rod 22b) that prevents the pin member from coming off after being inserted into the through holes 18a, 21c, and 21d.

The reinforcing member 21e is provided inside the top surface of the lid 21 at a position not in contact with the upper end of the bottomed cylindrical portion 19 of the push-up member 15. Here, as a modification, the reinforcing member 21e may have any shape as long as being reinforceable without being in contact with the upper end of bottomed cylindrical portion 19 of the push-up member 15, and a plurality of reinforcing members may be provided radially outward from the center of the lid, may be in a spiral shape, or may be provided outside the top surface of the lid 21.

The container 18 has the through hole 18a and a breakable portion 18b near the opening end. The breakable portion 18b is a portion of the through hole 18a that breaks when a predetermined force or more is applied toward a top of the drawing of FIG. 3.

As illustrated in FIGS. 1 and 3(b), the bottom of the container 18 is provided with a plurality of vent holes 24 communicating the inside and the outside of the container 18. A side wall of the container 18 is provided with a plurality of vent holes 25 communicating the inside and the outside of the container 18. When the push-up member 15 rapidly moves in the container 18, a negative pressure is generated in a region between the push-up member 15 and a bottom surface of the container 18. The negative pressure makes it difficult to move the push-up member 15. Therefore, by providing the vent holes 24 and 25, the phenomenon of negative pressure can be reduced, and the push-up member 15 can be smoothly moved.

The ejected object 16 is accommodated in the container 18 between an inner surface of the container 18 and an outer surface of the bottomed cylindrical portion 19 of the push-up member 15, for example, so as to surround the outer surface of the bottomed cylindrical portion 19. The ejected object 16 is folded such that an outer side of the ejected object 16 is not in contact with the inner side of the container 18. Note that the ejected object 16 is connected to, for example, one end of a string (not shown), and the other end of the string is connected to the inside of the container 18 or an airframe 31 of an aerial vehicle 30 (described later).

As the gas generator 17, only an igniter may be used, or a gas generator including an igniter and a gas generating agent may be used. Alternatively, a hybrid or a stored gas generator that cleaves a sealing plate in a small gas cylinder by a gunpowder igniter and discharges internal gas to the outside may be used. In this case, as a pressurized gas in the gas cylinder, a non-flammable gas such as argon, helium, nitrogen, or carbon dioxide, or a mixture thereof can be used. In order to reliably propel a piston when the pressurized gas is released, the gas generator may be provided with a heating element including a gas generating agent composition, a thermite composition, or the like.

The piston member 10, the cylinder 14, the push-up member 15, the gas generator 17, and the like mainly constitute an ejector that ejects the ejected object 16.

In the above configuration, when the gas generator 17 is operated, for example, at time of a fall of the aerial vehicle or the like equipped with the safety apparatus 100, the piston member 10 is propelled upward in the cylinder 14 by pressure of gas generated by the operation. Thus, the push-up member 15 having the bottomed cylindrical portion 19 connected to the rod 12 of the piston member 10 is propelled (projects) upward in the container 18. As a result, the lid 21 is pushed up by an upper part of the push-up member 15, and the pin member 22 breaks the breakable portion 18b of the container 18. Then, the lid 21 is detached, the opening end of the container 18 is opened, and the ejected object 16 is ejected to the outside (toward a top of the drawing of FIG. 1) from the inside of the container 18. In a case where the ejected object 16 is a parachute or a paraglider, the ejected object 16 is ejected from the container 18 and then deployed.

Figure 5:
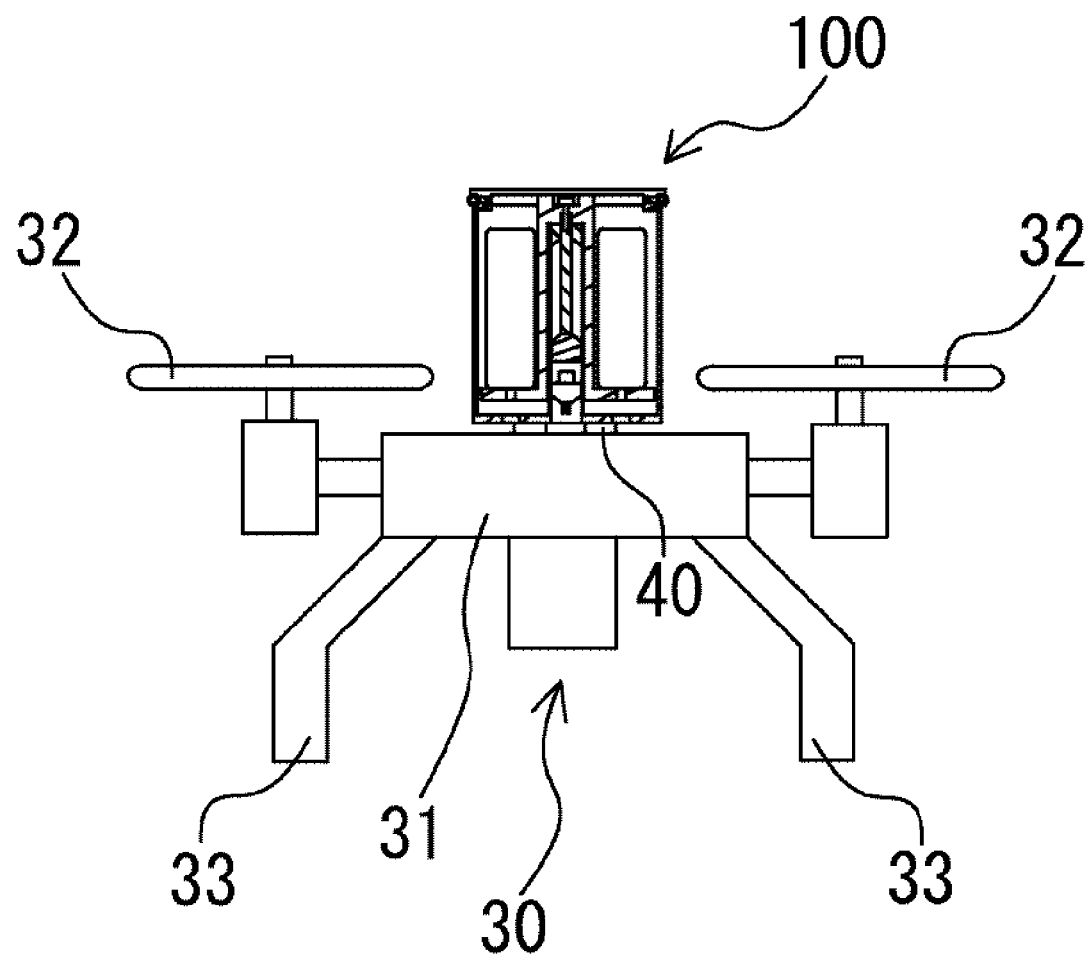
FIG. 5 is a diagram of an aerial vehicle to which the safety apparatus in FIG. 1 is applied.

As illustrated in FIG. 5, the safety apparatus 100 is coupled and fixed to the airframe 31 of the aerial vehicle 30 via a coupling member 40. At this time, as illustrated in FIG. 5, the coupling member 40 couples the container 18 and the airframe 31 at a position not to close the vent holes 24. Therefore, the aerial vehicle 30 includes the airframe 31, the safety apparatus 100 joined to the airframe 31, one or more propulsion mechanisms (for example, propellers) 32 joined to the airframe 31 to propel the airframe 31, and a plurality of legs 33 provided in a lower part of the airframe 31. Here, in practice, a socket for energization is fitted to an electrode in a lower part of the gas generator 17, but for convenience of description, the socket is omitted in FIGS. 1 and 5.

As described above, the present embodiment not only facilitates the positioning of the center of the bottom 19a of the bottomed cylindrical portion 19 of the push-up member 15 and the distal end of the rod 12 of the piston member 10, but also prevents the piston member 10 from rotating together in the cylinder 14. It is therefore possible to provide the safety apparatus 100 which is easier to assemble than a conventional art. It is also possible to obtain the aerial vehicle 30 including the safety apparatus 100.

The embodiment of the present invention has been described above with reference to the drawings. However, the specific configuration of the present invention should not be interpreted as to be limited to the embodiment. The scope of the present invention is defined not by the above embodiment but by claims set forth below, and shall encompass the equivalents in the meaning of the claims and every modification within the scope of the claims.

For example, the present invention includes the following modifications. The hole 51 need not be formed in the bottomed cylindrical portion 19 according to the embodiment. At this time, the head of the bolt member projects from the bottomed cylindrical portion of the push-up member, but the head only needs to be designed by adjusting a height position of the bottom of the bottomed cylindrical portion so as not to obstruct the lid being attached to the container (for example, not to be located at a position where the head pushes up the lid in the initial state).

In the embodiment, the push-up member and the rod of the piston member are coupled using the bolt member, but the present invention is not limited to this configuration. For example, an adhesive may be applied to the hole (corresponding to the hole 53 according to the embodiment) of the push-up member or the rod of the piston member to bond and couple the push-up member and the rod of the piston member. For example, an external thread may be formed at a distal end of the rod of the piston member, the rod may be passed through the hole of the push-up member, and a nut member having an internal thread may be tightened to the external thread to couple the push-up member and the rod of the piston member.

In the embodiment, the support 20 of the push-up member 15 extends from an edge of an opening of the push-up member 15, but the present invention is not limited to this configuration. Depending on a design such as matching the size of the ejected object 16, the support 20 may be extended from a midway of the bottomed cylindrical portion 19 of the push-up member 15.

In the embodiment, the gas generator is adopted as the power source, but the configuration is not limited as long as the sliding member can apply a driving force for propelling the inside of the cylinder to the sliding member. For example, an elastic body such as a spring may be adopted.

In the embodiment, the container 18 has a cylindrical shape. However, the present invention is not limited to this, and the container 18 may have another shape such as a quadrangular cylinder.

The piston member 10 in the embodiment may be configured as a telescopic structure.

In each embodiment, when a parachute or a paraglider is adopted as the ejected object, the parachute or the paraglider may be packed. The packing is configured to be broken or peeled off during operation.

In each embodiment, the parachute or paraglider have been described as the ejected object, but the present invention is not limited thereto. An ejected object including a lift generation member may be ejected as the ejected object. Examples of the lift generation member include a parafoil, a Rogallo parachute, a single surface parachute, an airplane wing, a propeller, and a balloon. When the lift generation member has a control line, the safety apparatus desirably includes a steering mechanism capable of changing an inclination angle of the ejected lift generation member using the control line. This steering mechanism includes a plurality of reels for winding up a plurality of control lines coupled to the lift generation member and includes a motor serving as power of the reels, for example. By winding up or pulling out the control lines by driving the motor, it is possible to appropriately pull the lift generation member or loosen a tension.

The cylinder, the power source, and the container are preferably coupled or fixed to the airframe by a rubber band, a belt, a string, or other means (mechanical joint, bolt, fastener, or adhesive) in the embodiment.

In the embodiment, one end of the rod 12 is fitted into the hole 53 by inserting the one end of the rod 12 from the insertion opening 53a, but the present invention is not limited to this configuration. For example, a part up to a midway of the hole 53 may be a simple through hole (having a circular cross section, for example), and may have a non-circular shape to which one end of the rod 12 is fitted from the midway.

Figure 6:
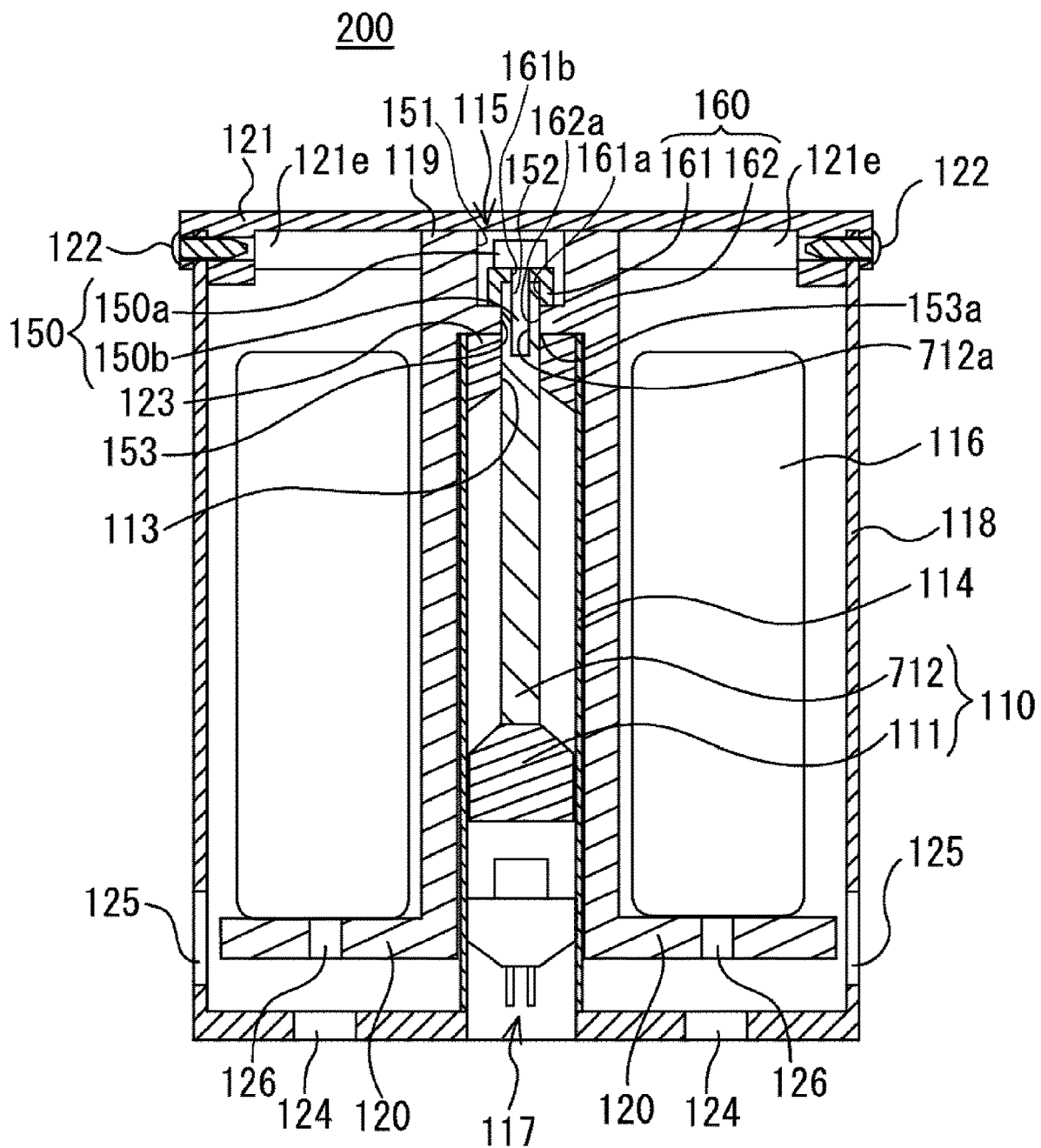
FIG. 6 is a diagram illustrating a modification of the safety apparatus in FIG. 1.

Instead of the embodiment, a safety apparatus according to a modification illustrated in FIG. 6 may be used. Hereinafter, the safety apparatus according to the present modification will be specifically described. Unless otherwise specified, parts similar to those in the embodiment are denoted by the same reference signs in the last two digits, and the description thereof may be omitted. In the present modification, the same components as those in the embodiment are used unless otherwise specified.

A safety apparatus 200 according to the present modification is different from the safety apparatus 100 mainly in that (1) a bottom 160 of a bottomed cylindrical portion 119 includes a part 162 having a substantially flat plate shape or a substantially columnar shape (substantially flat plate shape in the present modification) and a cylindrical member 161 fixed to the part 162 on a side opposite to a cylinder 114, (2) a first hole 153 having an insertion opening 153a is constituted by a hole 162a provided in the part 162 and an inner side 161a of the cylindrical member 161, (3) one end of a rod 112 passes through the part 162 from the cylinder 114 toward outside, and (4) a shape of the inner side 161a of the cylindrical member 161 and a shape of the one end of the rod 112 are substantially identical, and the one end of the rod 112 is fitted into the inner side 161a of the cylindrical member 161 (the inner side 161a of the cylindrical member 161 is a fitting portion) by inserting the one end of the rod 112 from the insertion opening 153a provided on a bottom 160 close to the cylinder 114 through the hole 162a to the inner side 161a of the cylindrical member 161, and (5) a rod 712 and a push-up member 115 are coupled by inserting an external thread 150b of a bolt member 150 into a hole 152 through a hole 161b provided in the cylindrical member 161 and screwing the external thread 161b with an internal thread 712a of the rod 712.

The safety apparatus 200 having the above configuration exerts effects similar to those of the safety apparatus 100.

REFERENCE SIGNS LIST 10, 110 piston member
11, 111 body
12, 112, 212, 312, 412, 512, 612, 712 rod
12a, 112a, 212a, 312a, 412a, 512a, 612a, 712a internal thread
13, 113 bore
14, 114 cylinder
15, 115 push-up member
16, 116 ejected object
17, 117 gas generator
18, 118 container
18a through hole
18b breakable portion
19, 119 bottomed cylindrical portion
20, 120 support
21, 121 lid
21a projection
21b receiving member
21c through hole
21d through hole 21e, 121e reinforcing member
22, 122 pin member
22a head
22b rod
23, 123 stopper
24, 25, 26, 124, 125, 126 vent hole
30 aerial vehicle
31 airframe
33 leg
40 coupling member
50, 150 bolt member
50a, 150a head
50b, 150b external thread
51, 52, 53, 151, 152, 153 hole
53a, 153a insertion opening
100, 200 safety apparatus

The invention claimed is:

1. A safety apparatus comprising:
a sliding member;
a cylinder that accommodates the sliding member in an inside and is provided with a bore through which the sliding member protrudes from the inside to an outside during operation;
a push-up member including a bottomed cylindrical portion disposed to cover at least a part of the cylinder and a flange protruding to the outside from an opening or a midway of a side surface of the bottomed cylindrical portion, the push-up member being pushed up in one direction by the sliding member;
an ejected object that is pushed up while being supported by the flange of the push-up member; and
a power source that moves the sliding member in the cylinder to protrude from the inside to the outside,
wherein the sliding member has one end (hereinafter, sliding member end) in a protruding direction to the outside, the one end having a cross section of a non-circular shape,
the bottomed cylindrical portion includes a bottom provided with a first hole having an insertion opening into which the sliding member end is inserted from the cylinder, and
at least a part of the first hole is provided with a fitting portion to which the sliding member end is fitted, the fitting portion having a substantially identical shape to the non-circular shape.

2. The safety apparatus according to claim 1, wherein the bottom of the bottomed cylindrical portion is an integrally molded product having a substantially flat plate shape or a substantially columnar shape,
the fitting portion is provided on a part of the first hole including the insertion opening or a midway of the first hole not including the insertion opening,
a second hole having a diameter smaller than a diameter of the first hole and communicating with the first hole is provided on a side of the bottom of the bottomed cylindrical portion, the side being opposite to the cylinder, and
the sliding member and the push-up member are fastened and fixed by fastening a bolt member having an external thread to an internal thread provided at one end of the sliding member in the protruding direction to the outside through the first hole and the second hole, or
the sliding member and the push-up member are fastened and fixed by fastening a nut member having an internal thread to an external thread provided at a distal end of the sliding member protruding through the first hole and the second hole.

3. The safety apparatus according to claim 1, wherein the bottom of the bottomed cylindrical portion includes a substantially flat plate part or a substantially columnar part, and a cylindrical member fixed to a side of the substantially flat plate part or the substantially columnar part, the side being opposite to the cylinder,
the first hole is provided from the insertion opening to an inner side of the cylindrical member, and
the fitting portion is provided in at least a part of the inner side of the cylindrical member.

4. The safety apparatus according to claim 1, wherein the non-circular shape is a polygonal shape, an elliptical shape, a star shape, or a gear shape.

5. An aerial vehicle comprising the safety apparatus according to claim 1, wherein the ejected object is a parachute or a paraglider.

* * * * *